Figure 2:
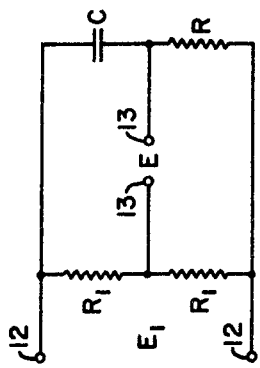

Feb. 23, 1965     H. B. FERGUSON     3,171,105

PLAYBACK SYSTEM

Filed Jan. 11, 1960

Henry B. Ferguson    Inventor

By *James A. Reilly*    Attorney

United States Patent Office 3,171,105
Patented Feb. 23, 1965

3,171,105
PLAYBACK SYSTEM
Henry B. Ferguson, Tulsa, Okla., assignor to Jersey Production Research Company, a corporation of Delaware
Filed Jan. 11, 1960, Ser. No. 1,587
4 Claims. (Cl. 340—174.1)

This invention concerns a playback system for reproducible-type records which is adapted to provide variable filtering by means of changing the speed of playback. The invention is particularly concerned with a system wherein the effect of a variable filter is obtained while using a fixed filter, by changing the speed of playback in a manner avoiding displacement of the resulting record with respect to time as would normally be the case. This application is a continuation-in-part of U.S. Serial No. 457,935, filed September 23, 1954, now abandoned, in the name of Henry B. Ferguson, entitled "Magnetic Playback System."

The present invention has particular application in providing a desirable reproducible-type recording system for use in seismic prospecting. It has recently become appreciated that seismic records prepared during seismic prospecting can advantageously be recorded on reproducible record media such as magnetic tape. The principal advantage of this technique is that the initial recording of seismic records can be carried out by recording all of the electrical output of seismometers without subjecting them to filtering prior to recording. Having obtained such a record, it is then possible to employ any desired filtering or to otherwise change the recorded signals during playback. This system therefore has the advantage of providing a great deal of flexibility, permitting experimentation and adjustment to obtain the maximum information from seismic prospecting.

In preparing permanent (i.e., visual) records of seismic signals, it is generally desirable to filter out a major portion of the frequency spectrum so as to secure a signal corresponding to the frequency of reflected seismic energy. Filtering serves to eliminate ground roll and other types of noise encountered in seismic prospecting which would otherwise obscure the significance of the seismic information. In general, it is desirable to employ a band pass filter having a band width of about 30 cycles measured at about three decibels from the peak frequency and having a peak frequency in the range of about 30 to about 70 cycles.

A second desideratum in seismic recording is to adjust the peak of the filter response in accordance with local conditions or, in many cases, during the course of recording successive events of a particular seismic shock. For example, in general, from the time of first receipt of seismic energy by a seismometer, the frequency of reflected seismic energy generally becomes lower on the latter part of the record. This makes it desirable to shift the peak frequency of the seismic filter during the particular record so as to lower the peak frequency in accordance with the change in frequency of successive reflections.

It has been generally appreciated that reproducible recording is well adapted to permit the type of filtering referred to hereinabefore. Thus it is known that the frequency of a given signal can be varied in proportion to the playback speed of a reproducible record. It becomes possible then, by employing a fixed filter and by changing the speed of playback, to effectively adjust the filter response in order to cover the desired frequency range. Suitable means for accomplishing this are particularly desirable since it provides an infinite number of effective filter settings while only necessitating a single filter. Furthermore, it permits variable filtering during playback of a particular record so as to maintain optimum filter responses at each position of the record in a manner which cannot be secured by use of fixed filters.

The present invention is concerned with provision of a reproducible recording system fully utilizing the advantages of variable filtering in response to variable playback speeds. The invention is particularly concerned with the solution of problems encountered in attempting to provide such a recording system as will become apparent from the description which follows.

Figure 1:
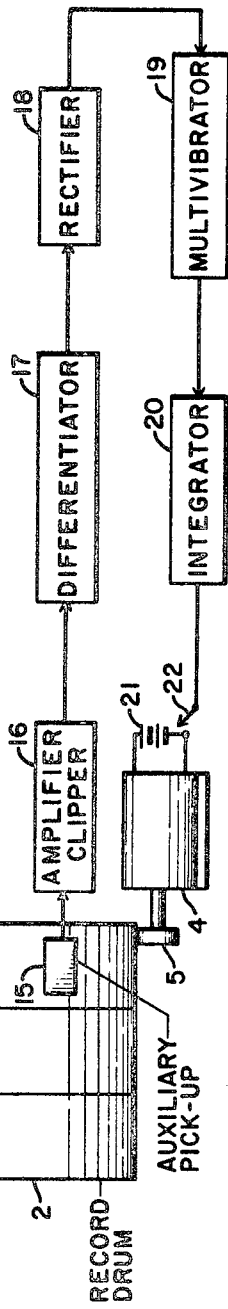
Figure 1:
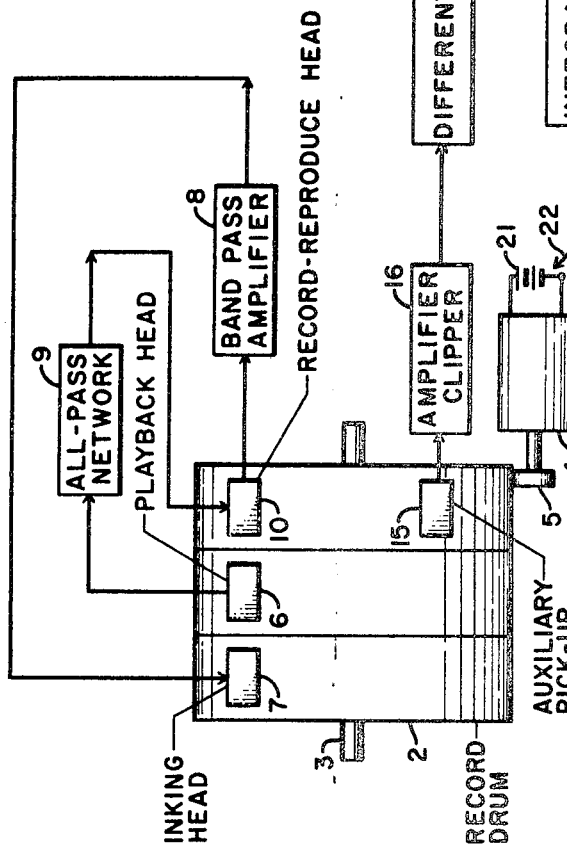

The nature of this invention will become apparent by reference to the accompanying drawings in which:

FIGURE 1 diagrammatically illustrates a magnetic playback system embodiment of this invention in which the essential electrical components are shown by block diagrams; and FIGURE 2 schematically illustrates a suitable form of circuit to provide the all-pass network required in the system of FIGURE 1.

Referring to FIGURE 1, a cylindrical recording drum is illustrated by the large rectangle 2. Cylindrical recording drum 2 may be rotated on shaft 3 and can be driven by a D.C. motor 4 by means of driving wheel 5 in contact with drum 2. As illustrated in FIGURE 1, the right-hand portion of drum 2 may be used for magnetic recording and playback, the left-hand portion of drum 2 for the preparation of a permanent record, and the central portion for playback of an original magnetic tape record. The present invention is of particular application to a magnetic recording system of this type in which the magnetic record tape and the permanent record medium (e.g., record paper or electrosensitive paper) are supported by a common drum, or are supported on two drums having a common shaft or, in other words, are synchronously driven. In the recording system referred to, a magnetic head 6 is supported over drum 2 so that a magnetic record may be impressed on a tape carried by the drum during recording. A bank of such magnetic heads may be employed when desired to prepare seismic records corresponding to a particular geophone array. In addition, an additional magnetic head, not shown, is employed to provide fiducial marks on the magnetic tape at the same time as the desired signal is originally recorded. Suitable fiducial marks may be prepared in any conventional manner by supplying a magnetic head with a constant frequency signal. It is apparent that the magnetic recording apparatus will be arranged so that fiducial record and the signal record or records will be spaced apart on the magnetic tape.

During conventional playback of a magnetic record of the character indicated, magnetic head 6 is used to develop an electrical voltage which can be applied directly through suitable connections, not shown, to an inking head 7 arranged over a record paper carried by drum 2. If the magnetic record is a multi-trace one, each of the traces can be converted to a permanent ink record by sequentially driving the inking head 7 from trace to trace of the magnetic record. A mechanism for accomplishing this is shown in co-pending application Serial No. 461,811, P. S. Williams, filed October 12, 1954.

In the magnetic recording playback system described in the preceding paragraph, it is apparent that the frequency of the output signal of playback head 6 will vary linearly with the playback speed. Thus, by doubling the speed of motor 4, the frequency output of head 6 will also be doubled. Consequently, by using a fixed filter peaked at a particular frequency, it would be theoretically possible to change the playback speed so as to obtain any desired frequency response from the fixed filter. It would appear, then, that a constant time delay filter could be employed for this purpose so that a constant time delay would be obtained at all frequencies for any given playback speed. However, on analysis, it can be appreciated that such a filter actually has an effective time delay which varies directly with the speed of playback. This creates a serious problem since the fiducial marks referred to earlier, developed by a constant-frequency magnetic record, will appear at fixed distances along the record independent of any changes in the playback speed. As a result, there will be an apparent time shift of the seismic record traces as the speed of playback is changed in the event that a constant time delay filter is employed. It is apparent that this is a serious disadvantage which would substantially eliminate the advantages of variable filtering by change of speed during playback. The change in time delay of the seismic signals which would be encountered would obscure the critical seismic information since the time between seismic events must be accurately known.

Still referring to the embodiment shown in FIGURE 1, the present invention is concerned with use of a filter 9 in the magnetic playback system which will avoid changes in the time delay of a signal resulting from changes in the speed of playback. It can be developed that such a filter is one whose time delay vs. frequency characteristic bears an inverse relationship to the time delay vs. speed characteristic. In other words, since the time delay of a constant time delay filter varies directly as a function of the playback speed, the time delay of the filter should be inversely proportional to the frequency. By mathematical derivation, it can be established that the required phase response of a filter to give this time delay characteristic should be $$\theta = K \frac{1}{\log_e f}$$

where K is an arbitrary constant and $f$ is the frequency.

Band pass amplifier 8 will combine amplification and filter stages to provide a pass band of the desired width. As indicated, in the case of seismic signals, this can desirably be a band width of about 30 cycles as measured at about three decibels from the peak response.

The output of all-pass network 9 can be used to drive recording head 10 so as to obtain an intermediate record introducing time shifts in the recorded signal which vary with variations in the frequency of the signal.

By the technique described, it is possible to vary the effective peak frequency of band pass amplifier 8 by changes in the speed of motor 4. Thus, for a given record, it may be desirable to operate motor 4 at a first speed at which amplifier 8 will provide peak response at 30 cycles. In a second situation or even during preparation of the same record, it may be desirable to secure a peak frequency response of 60 cycles. This can be secured in the system described by halving the speed of motor 4. Similarly, by continuously varying the speed of motor 4, the filtering characteristics of the system described can be continuously varied as desired.

It is apparent that, in this arrangement, band width will remain constant even though playback speed is varied. In the event it is desired to secure variable band width as well as variable peak frequency, filters having selected band width can be switched into the circuit in place of the band pass amplifier 8. With this provision, the system described is capable of any desired degree of flexibility.

Referring now to FIGURE 2, a suitable circuit for use in the all-pass network 9 is illustrated. In the circuit of FIGURE 2, an input voltage $E_I$ which may be the output of playback head 6 is impressed across terminals 12. Equal resistances $R_1$ are connected in series between the terminals 12 and are shunted by capacitance C and resistance R. The output voltage $E_O$ may be obtained from terminals 13. By plotting $E_O$ for varying values of C and R, it can be shown that the amplitude of $E_O$ is constant and its phase can be varied from 180° at zero frequency to 0 at infinite frequency. Variations of R and C cause production of a frequency vs. phase response providing a family of curves which can be described as "bulging" at different selected frequencies. By employing at least two such circuits illustrated in FIGURE 2, and preferably three such circuits, by graphical solution, it is possible to secure an output phase relation of the nature described above.

It is a particular feature of this invention that means can be employed to automatically or variably control the speed of playback to provide optimum filter characteristics. The remaining elements of FIGURE 1 illustrate in block diagram suitable means to accomplish this objective.

An auxiliary pickup head 15 is positioned somewhat ahead of the playback head 6 with respect to the record trace detected by head 6. The output of the auxiliary pickup 15 is supplied to an amplifier clipper circuit 16 to secure square wave pulses having a frequency corresponding to the frequency of the detected record. The square wave pulses are then supplied to a differentiating circuit 17, which provides an output having narrow peaks above and below a reference voltage corresponding to the leading edge of each of the square wave pulses. The output of differential circuit 17 is then rectified by rectifier 18 in order to eliminate the negative pulses. The resultant pulses are then preferably passed to multivibrator 19 provided with a pulse width control to secure square wave pulses of constant height and constant width during a particular recording process. The output of multivibrator 19 is then averaged by integrator 20 to provide a D.C. voltage output having a value proportional to the frequency of the signal initially picked up by pickly 15. This D.C. voltage may be supplied to the D.C. circuit 21 operating motor 4 so as to buck the voltage applied to motor 4. As a result, as the frequency of the record signal increases, a greater D.C. voltage will be developed by the integrator circuit 20, causing a successively smaller voltage to be available to drive motor 4. In this manner, the speed of the playback can be inversely changed in respect to the frequency of the signal detected by pickup 15. Switch 22 is closed for variable speed control, and it is open for constant speed control. Constant speed is made possible by constant voltage source 21.

It is apparent that pickup 15 should be arranged with respect to pickup 6 so as to lead sufficiently to cause the lag in the response of motor 4 to correspond to the time displacement between pickups 15 and 6. In this manner, the circuit described serves to automatically and continuously adjust the playback speed to secure the optimum filter characteristics.

As described, the present invention provides a means for securing variable filtering of a magnetically recorded signal during playback. This is achieved by provision of a filter-amplifier combination having a phase response.

$$\theta = K \frac{1}{\log_e f}$$

With this phase response, changes in record speed will effectively change the filtering frequency without the distortion otherwise encountered.

To further illustrate the invention, reference is made to a specific example in which the magnetic record of a seismic signal of variable frequency is placed on the central portion of drum 2 to travel beneath head 6. With switch 22 open, drum 2 is rotated at constant speed by motor 4 so that the signal reproduced by head 6 is transmitted through all-pass network 9 to head 10. The speed in this instance should be the same as the speed of the original magnetic recording. Conveniently, head 10 records the latter signal on a magnetic record medium on the right-hand portion of drum 2. All-pass network 9, as explained earlier, introduces a preselected amount of phase shift in the signal as it passes between the heads 6 and 10.

After the record trace has been transferred at constant playback speed from the magnetic record medium below head 6 to the magnetic record medium below head 10, switch 22 is closed and motor 4 then used to drive drum 2 at variable speed. The record trace is then reproduced by head 10, and it is passed through band pass amplifier 8 to inking head 7 which records it in permanent form on paper wrapped around the left-hand portion of drum 2. The phase shift which occurs in the signal as it passes through amplifier 8 is compensated for by the previous shift which took place in passing through network 9.

It will be apparent that the invention has application to reproducible records other than magnetic ones. For example variable-density records, variable-area records, and variable-color records may also be used. Appropriate transducers such as photocells and glow tubes must, of course, be used with such records. It will further be apparent that it is particularly desirable to use a magnetic record medium for recording the signal produced by the network 9.

The invention claimed is:

1. In a system wherein a magnetic record of an electrical signal is played back through a playback circuit to reproduce the said signal, the improvement which comprises a filter in the playback circuit characterized by having a phase response $$\theta = K \frac{1}{\log_e f}$$

where K is a constant and $f$ is the frequency of the reproduced signal, whereby the effective frequency response of the filter may be changed by changing the speed of playback while applying the same amount of time delay to the said signal regardless of the speed of playback.

2. Magnetic playback apparatus comprising, in combination: pickup means to derive an electrical signal from a magnetic record, means to drive a magnetic record past said pickup means at a selected speed, combined amplifier and filter means connected to said pickup means, said amplifier and filter means having a phase response $$\theta = K \frac{1}{\log_e f}$$

where K is a constant and $f$ is the frequency of the signal supplied to said amplifier and filter means, and means for recording the resulting signal.

3. Apparatus as defined by claim 2 wherein said means for permanently recording the resulting signal and said means to drive the magnetic record are synchronously driven.

4. In an apparatus for reproducing a variable frequency electrical signal from a magnetic trace record of the signal including trace playback means and drive means adapted to effect relative movement between said trace playback means and the length of said trace, the improvement which comprises combination electrical filter and amplifier means adapted to receive the reproduced electrical signal, said combination means being of a character to pass signals falling within a predetermined band of signal frequencies and having a phase response $$\theta = K \frac{1}{\log_e f}$$

where K is a constant and $f$ is the frequency of a signal supplied to the combination means.

References Cited by the Examiner
UNITED STATES PATENTS

| | | | |
|---|---|---|---|
| 2,590,822 | 3/52 | Minton | 333—70 R |
| 2,604,955 | 7/52 | Hawkins | 340—15 X |

IRVING L. SRAGOW, *Primary Examiner.*

JOHN F. BURNS, *Examiner.*